No. 607,355. Patented July 12, 1898.
C. EICKEMEYER.
CARRIER FOR BICYCLES.
(Application filed Nov. 17, 1896.)
(No Model.) 2 Sheets—Sheet 1.
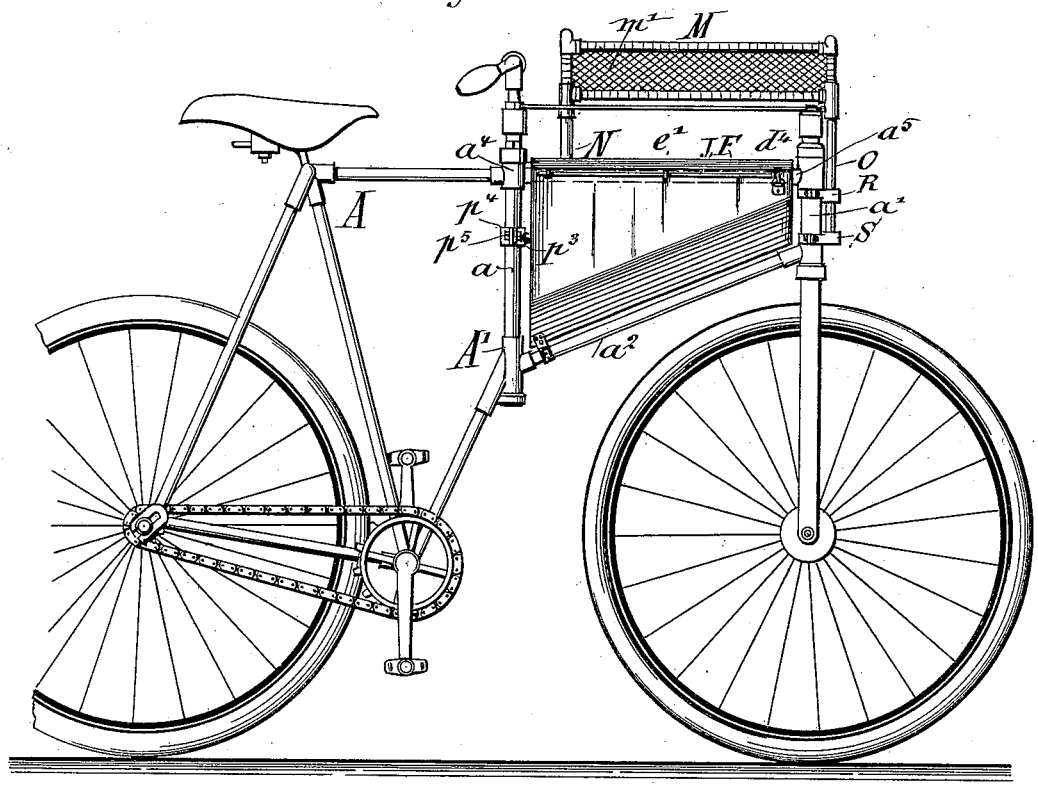
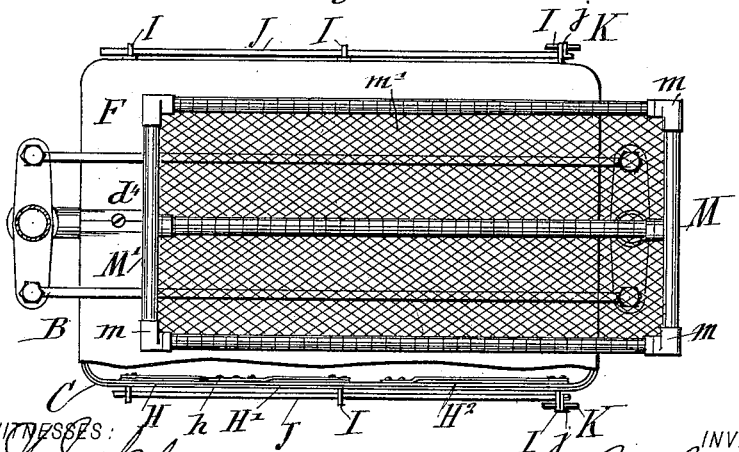
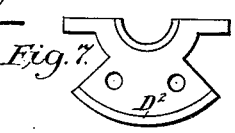

No. 607,355. Patented July 12, 1898.
C. EICKEMEYER.
CARRIER FOR BICYCLES.
(Application filed Nov. 17, 1896.)
(No Model.) 2 Sheets—Sheet 2.
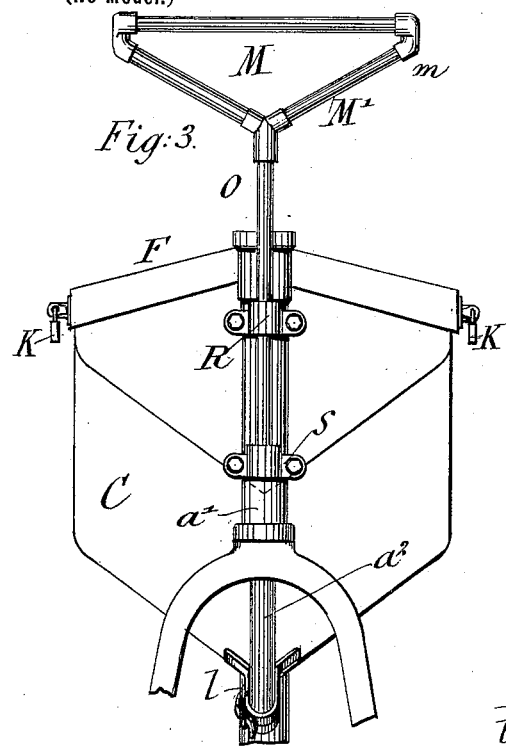
Fig. 3.
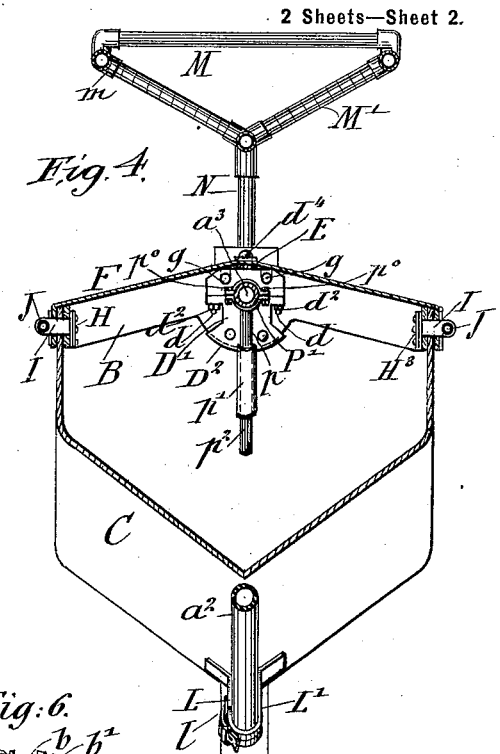
Fig. 4.
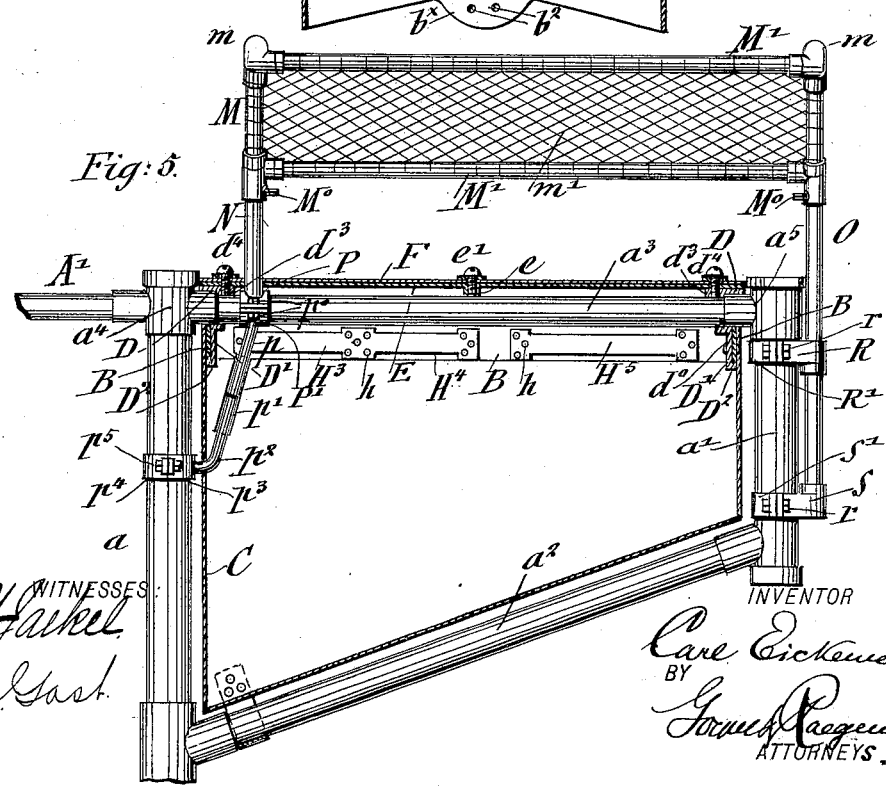
Fig. 5.
Fig. 6.
WITNESSES
INVENTOR
Carl Eickemeyer
BY
ATTORNEYS.
THE NORRIS PETERS CO., PHOTO-LITHO., WASHINGTON, D. C.

UNITED STATES PATENT OFFICE.

CARL EICKEMEYER, OF YONKERS, NEW YORK.

CARRIER FOR BICYCLES.

SPECIFICATION forming part of Letters Patent No. 607,355, dated July 12, 1898.

Application filed November 17, 1896. Serial No. 612,416. (No model.)

*To all whom it may concern:*

Be it known that I, CARL EICKEMEYER, a citizen of the United States, residing at Yonkers, in the county of Westchester and State of New York, have invented certain new and useful Improvements in Luggage-Carriers for Bicycles, of which the following is a specification.

This invention relates to a luggage-carrier for bicycles, the object of the invention being to provide soldiers, tourists, &c., with a durable and satisfactory means for carrying necessary implements, equipments, blankets, &c.

The invention consists of certain features of construction and combinations of parts to be hereinafter described and then particularly claimed.

In the accompanying drawings, Figure 1 is a side elevation of a bicycle provided with my improved luggage-carrier. Fig. 2 is an enlarged top view of the luggage-carrier, partly broken out, shown applied to a bicycle. Fig. 3 is an end elevation of the luggage-carrier. Fig. 4 is a transverse section thereof. Fig. 5 is a sectional side elevation. Fig. 6 is a transverse section of the distending-frame of the bag or valise, and Figs. 7 and 8 are respectively an enlarged side elevation and transverse section of the lower halves of the valise-supporting clamps or clips.

Similar letters of reference indicate corresponding parts.

In the drawings, A represents a bicycle of special type, the front portion A' of the main frame of which is provided with an intermediate working spindle-support $a$ for the front-fork spindle, a front-fork-spindle support $a'$, and connecting-tubes $a^2$ $a^3$. At the juncture of the part $a$ with the part $a^3$ a T $a^4$ is arranged, while at the juncture of the part $a^3$ with the part $a'$ an L $a^5$ is arranged.

The luggage-carrier of the present invention is a device to be applied to a bicycle-frame constructed substantially as stated.

B represents the distending or supporting frame of the valise, which, as shown, is provided with a multiplicity of holes, through which wax cords or other suitable fastening means may be passed for securing the body C of the bag or valise thereto, this body C being made of wire-netting, canvas, cardboard, or leather, or any suitable material, preferably leather. The end portions of the distending-frame B are of approximate V shape, so as to impart to the top or cover of the valise a downward slope from each side of the center line of the same. The body of the valise is so conformed as to fill the space between the tubular parts $a$ $a'$ $a^2$ $a^3$ of the frame of the machine. In the mid-lengths of the end portions of the distending or supporting frame B of the valise are deep recesses $b$, while adjacent to said recesses at each side thereof are smaller recesses or depressions $b'$. Below each of the larger recesses $b$ is a pair of rivet-holes $b^2$, and the use of these and of the recesses $b$ $b'$ will be hereinafter particularly referred to.

D D' represent the upper and lower halves of a pair of clamps or clips by means of which the valise is supported from the connecting-bar or reach $a^3$ of the frame of the machine. The upper halves D of each pair of clamps are each provided with studs $d$, which are preferably screw-threaded and are passed through holes in the lower halves D' of the clamp, which lower halves are secured to the upper halves by means of nuts $d^2$, screwed onto said studs. The upper halves D of the clamps are each provided at one side of their mid-lengths with ears $d^3$, through which connecting-screws $d^4$ pass, said screws also passing through a connecting strip or rib E, that extends from one end of the frame B of the valise to the other. The lower halves D' of the clamps are constructed at their lower edges with curved flanges D², which serve as rests for the downwardly-curved portions $b^\times$ of the distending-frame below the end recesses therein, to which lower halves the ends of the distending-frame are connected by means of rivets $d^0$, that pass through the holes $b^2$ therein, while the said end recesses receive the tube or reach $a^3$. The meeting portions of the upper and lower halves of the clamps are respectively recessed so as to correspond with and fit over the inwardly-projecting ends of the coupling $a^4$ and the L-coupling $a^5$, so as to form shoulders abutting against the ends of said coupling to prevent spreading apart of the clamps when the halves of the same are secured together by means of the connecting-fastenings and are applied to the connecting-tube or reach $a^3$. While the described conformations of the halves of the clamps prevent spreading of the same, they are prevented from moving toward one another by means of the connecting strip or bar E. The radial movement of the valise with respect to the frame is prevented by means of the strap and buckle connected to the lower tube $a^2$ and which will be hereinafter fully described. The connecting strip or bar E is provided at is mid-length with a boss $e$, which has a screw-threaded opening to receive the screw $e'$, whereby in connection with the other connecting-screws the cover F is attached and the weight of the valise or bag borne. The cover F of the valise or bag being connected to the strip or bar E by means of said fastening-screws, washers $i$ are placed between the heads of the screws and the cover, so as to provide greater bearing-surface. The upper halves D of the said clamps are provided with two laterally-projecting pins $g$, which fit into the small recesses $b'$ at each side of the end portions of the distending-frame and prevent the spreading of the top of the frame and, furthermore, strengthens the construction.

At the inner sides of the distending-frame B are springs H, H', $H^2$, $H^3$, $H^4$, and $H^5$, which are secured by suitable rivets or other fastenings $h$ to the frame, so that the opposite ends of the said flat springs are free to move. At the free ends of the said flat springs the same are provided with lugs I, which are secured thereto in any suitable manner and are perforated and which are adapted to be pressed, under the actuation of the said springs, through suitable openings formed in the distending-frame B, the body C, and the cover F of the valise. The openings in the said lugs I, when the springs force them into their outermost position to project beyond the side walls of the bag-body, will be arranged outside of the bag-body, so that they may receive the lock-bars J, which extend longitudinally of the sides of the valise. Said lock-bars J are approximately the length of the body of the valise and extend, respectively, through all of these lugs I, arranged at opposite sides of the bag. One of the lugs I of the actuating-springs at each side of the body of the valise is extended and is provided with a second perforation, which, in connection with the perforation in a lateral projection $j$ at one end of each lock-bar, receives the hasp of a padlock K, whereby the lock-bar is secured in position.

On unlocking the padlocks K and removing the same the lock-bars can be withdrawn, so that the spring-actuated lugs I can be pressed slightly in, thereby enabling the cover F of the valise to be lifted. When closing the cover or lid, the lugs are pressed in by the same and under the actuation of their springs will move into the slots provided in the rim or flange of the cover or lid, so that the lock-bars can again be inserted through the perforated lugs I and the padlocks again applied for locking the cover or lid to the body of the valise.

At the lower part of the valise-body C are two straps L and L', which are riveted or otherwise suitably fastened to the same. The strap L' is provided with a buckle $l$, which receives the perforated strap L, so that its tongue can engage with said strap when the straps are tightened around the tube $a^2$. These straps provide convenient means whereby the valise can be taken out or replaced on the machine with ease, and at the same time they prevent any side motion to the valise, as otherwise the valise might tend to swing out of the plane of the machine.

The top basket M, which is arranged above the valise on the frame of the machine, is composed of pieces of tubing M', connected by suitable T and L couplings $m$ at the corners, while to the frame of the basket is applied wire-netting $m'$ or other suitable material $M^2$. The lower couplings of the basket-frame receive set-screws $M^0$, by means of which the basket may be adjusted on the vertical supports N O and which also enable the basket to be readily taken off its supports when not required for use.

The lower part of the support N carries the upper half P of a clamp which is applied to the reach or connecting-tube $a^3$, the lower part $p'$ of which clamp carries a downwardly-extending partially-inclined stem $p$, which in turn carries rigidly a sleeve $p'$. The upper and lower halves P P', respectively, of the clamp just described are fastened together by means of bolts and nuts $p^0$. Suitable holes in the cover of the valise and in the connecting top strip or rib E permit the standard N to pass upwardly. The sleeve $p'$, just referred to, passes over a stem $p^2$, which in turn passes through a hole in the rear end of the valise, where, outside of the valise, it is provided with a half $p^3$ of another clamp, which, in connhction with the other half $p^4$ of said clamp and connecting-bolts and nuts $p^5$, serves as a means for coupling and rigidly securing said stem $p^2$ to the intermediate working spindle-support $a$. The sleeve $p'$, which engages with the downwardly-extending stem and with the upwardly-extending stem $p^2$, merely prevents any tendency of the basket to swing out of the line which might take place when the basket is filled, the main support of the basket, however, being on the connecting-tube or reach $a^3$, to which it is tightly clamped. By employing the two stems $p$ $p^2$ instead of one connecting support or strut—in other words, dividing the support—the smallest possible hole is permitted to be made in the body of the valise C. Were it not for this, the connecting-stems between the clamp applied to the part $a$ and the clamp applied to the part $a^3$ could be made of one piece.

When the machine is used for military purposes, it is proposed to make part P a part of the upper half D of one of the other clamps and to make P' a part of the lower half D' of the clamp, as by so constructing said parts the cost of their manufacture is greatly lessened and at the same time the construction is simplified as much as possible, so as to fit the machine for this kind of work. This construction can also be used at the forward end of the basket M; but for convenience in using the valise independent of the basket and allowing the valise to be as free from holes as practicable when so used the front support O carries at its lower end the halves R S, respectively, of two clamps, which, in connection with the other halves R' S', are applied to and rigidly secured upon the working spindle-support a' by means of connecting-bolts and nuts r.

The described luggage-carrier, consisting of the valise, the basket, and the devices for attaching the same to the basket, furnishes a very durable, substantial, and efficient appendage for bicycles which are used for military purposes or by tourists or others.

Having thus described my invention, I claim as new and desire to secure by Letters Patent—

1. In a bicycle, the combination with a connecting-tube or reach of the frame, of a valise or bag provided with a rigid distending-frame at its upper part, said connecting-tube or reach passing through the valise above said distending-frame, and clamps secured to the distending-frame and attached to said connecting-tube or reach, whereby the body of the valise or bag is supported below the latter, substantially as set forth.

2. In a bicycle, the combination with a connecting-tube or reach of the frame and suitable abutments thereon, of a valise or bag provided with a rigid distending-frame at its upper part, said connecting-tube or reach passing through the valise, and clamps secured to the distending-frame and rigidly attached to the connecting-tube, said clamps being also seated against said abutments at each end of the valise, whereby the body of the valise or bag is supported immovably below the connecting-tube or reach, substantially as set forth.

3. In a bicycle, the combination with the frame and suitable abutments thereon, of a valise or bag provided with a distending-frame at its upper part, said bicycle-frame passing through the valise, and clamps secured to both ends of the distending-frame, and the inner surfaces of which clamps are constructed to conform to the portion of the frame of the bicycle upon which they are applied, and to enlargements formed by the abutments, said clamps being seated on and firmly applied to the abutments and the portion of the frame of the bicycle adjacent to said abutments, substantially as set forth.

4. In a bicycle, the combination, with the main frame constructed with a top connecting-tube or reach, of clamps applied rigidly to said connecting-tube or reach near each end, said clamps consisting of upper and lower halves, and means for securing said halves together, and a valise or bag provided with a distending-frame and with a cover or lid, said lower halves of the clamps being rigidly secured to the end portions of the distending-frame, whereby the main support for the body of the valise or bag is furnished, while the upper halves of the clamps support the cover or lid of the valise or bag, substantially as set forth.

5. In a bicycle, the combination, with the frame and couplings, of clamps applied to the frame against the ends of said couplings and consisting of upper and lower halves, means for securing said halves together around the ends of the couplings, and a valise or bag provided with a distending-frame and with a cover or lid, said lower halves of the clamps being secured to the ends of the distending-frame for furnishing the main support for the valise or bag or the like, while the upper halves of the clamps support the cover or lid of the valise or bag, substantially as set forth.

6. In a bicycle, the combination, with the main frame provided with suitable abutments, of clamps applied rigidly to the frame against said abutments, a valise or bag suspended by said clamps and through which the frame of the machine passes, and a metallic connecting strip or bar applied to the clamps and extending along and above the frame, whereby the movement of the clamps toward each other is prevented, substantially as set forth.

7. In a bicycle, the combination, with the main frame provided with suitable abutments, clamps applied to said abutments, and a valise or bag suspended by said clamps and through which the frame of the machine passes, of a connecting strip or bar rigidly applied to the clamps and extending along and above the frame, and a cover or lid for the valise, said cover or lid being applied to and supported by said strip or bar, substantially as set forth.

8. In a bicycle, the combination with the main frame, of clamps applied to the main frame, a valise or bag suspended by said clamps and through which the frame of the machine passes, said valise or bag being provided with a distending-frame attached to the clamps and arranged under the supporting portion of said main frame of the bicycle, and a connecting strip or bar rigidly applied to the clamps and extending along and above said supporting portion of the main frame, substantially as set forth.

9. In a bicycle, the combination with the main frame, provided with a top connecting-tube or reach, of clamps rigidly supported on said connecting-tube or reach and provided with outturned flanges at an angle to the main bodies of the clamps, and a valise or bag provided with a distending-frame connected with said clamps, said flanges engaging with the end portions of said distending-frame, substantially as set forth.

In testimony that I claim the foregoing as my invention I have signed my name in presence of two subscribing witnesses.

CARL EICKEMEYER.

Witnesses:
 P. HENRY OSTERHELD,
 GEO. EICKEMEYER.